United States Patent [19]

Penttonen

[11] Patent Number: 5,627,877

[45] Date of Patent: May 6, 1997

[54] METHOD FOR RELOCATING A SUBSCRIBER IN A VOICE MESSAGING SYSTEM

[75] Inventor: Jyrki Penttonen, Helsinki, Finland

[73] Assignee: Tecnomen Oy, Espoo, Finland

[21] Appl. No.: 439,758

[22] Filed: May 12, 1995

[30] Foreign Application Priority Data

May 13, 1994 [FI] Finland .................................. 942219

[51] Int. Cl.$^6$ .............................. H04Q 7/22; H04Q 7/24
[52] U.S. Cl. ............................... 379/58; 379/59; 455/33.1
[58] Field of Search .................... 379/56, 57, 58, 379/59, 60, 67, 88, 89; 455/33.1, 33.2

[56] References Cited

U.S. PATENT DOCUMENTS

| | | | |
|---|---|---|---|
| 4,790,003 | 12/1988 | Kepley et al. | 379/88 |
| 5,177,780 | 1/1993 | Kasper et al. | 379/59 |
| 5,257,399 | 10/1993 | Kallin et al. | 455/33.1 |
| 5,278,897 | 1/1994 | Mowery et al. | 379/212 |

OTHER PUBLICATIONS

Proposal, Straw Man for Automatic Roaming Electronic Industries Association TR–45.2 Cellular System Operation Working Group II. Jun. 18, 1985.

*Primary Examiner*—Curtis Kuntz
*Assistant Examiner*—Nay Aung Maung
*Attorney, Agent, or Firm*—Woodard, Emhardt, Naughton Moriarty & McNett

[57] ABSTRACT

A method for relocating a subscriber in a voice messaging system (VMS) which is connected with an extensive digital mobile network (GMS), including a plurality of mobile switching centres (MSC) and a home location register (HLR). In the method, VMS checks HLR repeatedly for the location of a subscriber and concludes on the basis of this information whether the subscriber has moved into the area of some other MSC for a period of time longer than a predetermined period of time and, in a positive case, the old VMS transfers the subscriber-related information to the new VMS, thus accomplishing the automatic relocation of the subscriber's home station in connection with a new MSC.

5 Claims, 3 Drawing Sheets

METHOD FOR RELOCATING A SUBSCRIBER IN A VOICE MESSAGING SYSTEM

FIELD OF THE INVENTION

The present invention relates to a method as set forth in the preamble of claim 1 for relocating a subscriber in a voice messaging system.

DESCRIPTION OF THE PRIOR ART

In extensive multi-station digital mobile networks, the internal communication between stations incurs costs and, thus, should be minimized. Internal communication is created as the subscribers travel within the boundaries of several stations, whereby the calls assigned to them must be routed from station to station.

In practice it has been found that 70% of the calls made to a mobile network fail one way or the other. If the network includes a voice messaging system (VMS), these failed calls create traffic in the VMS system (receiving and discharging messages). Thus, the voice messaging system involves transmitting a lot of information from a subscriber to the voice mail and vice versa. If the subscriber has "a home station" which is different from the one within which he or she is presently located, it is necessary to carry the traffic over inter-station trunk connections back and forth between the voice messaging station and the subscriber.

Hence, the problem is that this internal traffic requires increased capacity for trunk connections and switching centres. Building more capacity incurs costs. This invention serves to reduce the capacity demand of trunk connections and centres and thus the costs of a mobile network.

The network loading can be equalized by means of a method, wherein the PLMN network itself takes care of routing the calls to an appropriate VMS station. It analyzes traffic congestions between various stations and directs traffic to least loaded connections. This method is not capable of reducing the amount of traffic but it is just distributed more evenly within a network.

In the global system for mobile communications (GSM), each subscriber is allocated an MS-ISDN number at the commission of a telephone. Depending upon where the telephone is purchased, that number may be assigned to a station other than the one within which the subscriber is normally located. Thus, the allocation of an MS-ISDN number is not under the control of an operator and cannot be used to conclude which station a subscriber is located within. The mobile networks are provided with a home location register (HLR) which contains information about the area a subscriber is located within. This information is used by PLMN for directing the calls to a subscriber.

SUMMARY OF THE INVENTION

An object of the present invention is to alleviate or eliminate the above problems by providing a method for the adaptive relocation of a subscriber in a VMS system. Thus, a mobile subscriber is always assigned the VMS system "home station" wherever he or she is most often located by using the information available from the HLR of a mobile network. In order to achieve this object, a method of the invention is characterized by what is set forth in the characterizing section of claim 1.

One important benefit of the invention is that the subscriber can be transferred from one station to another, whereby the traffic to be forwarded to him or her can be transmitted by this station without having to circulate it over other stations. This reduces the demand for an intra-network MSC traffic. The investments on trunk lines and exchange/centre equipment can be reduced (avoided) considerably. This is of a special significance for operators who do not have their own lines but are forced to lease those.

The invention will now be described in more detail with reference made to the accompanying drawings, in which:

DESCRIPTION OF THE PREFERRED EMBODIMENT

Figure 1:
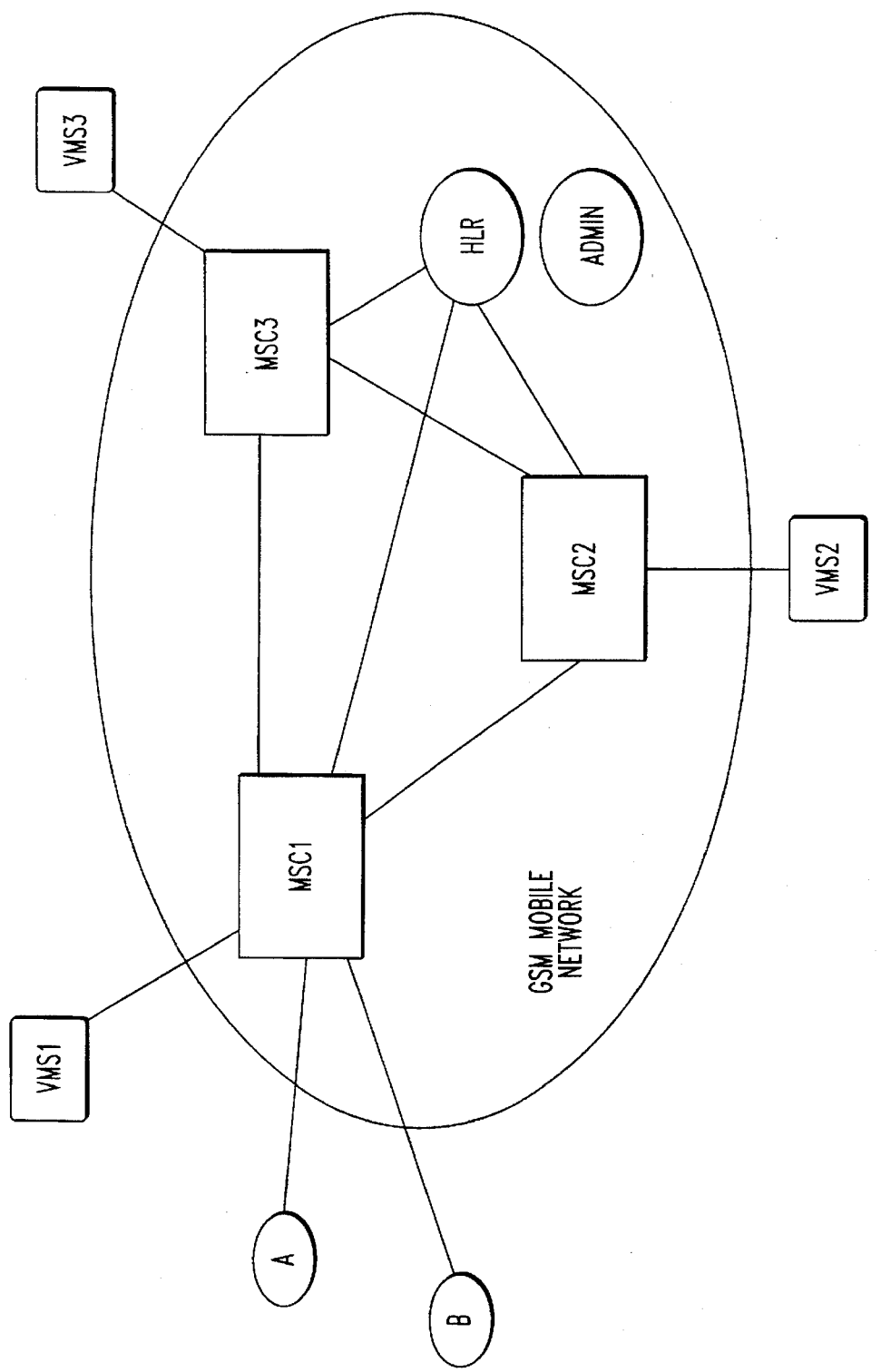
FIG. 1 shows schematically a multi-station VMS system in a mobile network.

FIG. 1 depicts a multi-station VMS system in a mobile network. Each MSC in the network has its own VMS.

If "the home station" of a subscriber A in the voice mail is VMS2 and a subscriber B leaves him or her a message, the message and its delivery must be carried back and forth over MSC1 and MSC2. Instead, if the home station of A is defined to be VMS1, the information can be transmitted within MSC1.

The following depicts a statistical analysis on the effect of the invention:

A type of network shown in FIG. 1 includes 20 MSC's/VMS's. Traffic/subscriber in VMS is 5 mErl, calls/subscriber/busy hour (BH) is 0.5. The number of subscribers is 1.000.000. The trunk line demand 1 PCM/25 Erl.

In situation A, where the invention is not used, the demand for trunk lines can be calculated as follows:

Subscribers are subjected to various MSC's at random.

Subscriber X has 95% of calls coming from other MSC's, 5% from his or her own.

traffic on trunk lines=95% * 5 mErl * 1.000.000=4750 Erl trunk line demand=4750 Erl/25=190 PCM, investments on trunk lines FIM 19 million.

In situation B, where the invention is used, the demand for trunk lines can be calculated as follows:

Subscribers are subjected to various MSC's adaptively.

Subscriber X has 5% of calls coming from other MSC's, 95% from his or her own.

traffic on trunk lines=5% * 5 mErl * 1.000.000=250 Erl trunk line demand=250 Erl/25=10 PCM, investments on trunk lines FIM 1 million.

A method of the invention is carried out as follows:

As for the operation of a mobile network (GSM), the relocation of a subscriber proceeds as follows:

Upon the purchase of a telephone (or a SIM card therefor), the subscriber is allocated an MS-ISDN number therefor. The seller of a telephone feeds the subscriber information into the ADMIN computer of the system. The ADMIN determines the subscriber into HLR and allocates the subscriber in a VMS subjected to the MSC according to the area the telephone is purchased within (the MS-ISDN number reveals its location). Thus, the network HLR has the information about which station area the subscriber is located within. This information is delivered thereby to all MSC's at fixed times. The information is used for forwarding the calls from other station areas over a relevant MSC to the subscriber. Those subscriber-bound calls, which cannot be forwarded to the telephone of a subscriber, are delivered into the subscriber's voice mail box which is included in a VMS determined as the subscriber's home station.

The VMS checks periodically, once a day, the location of a subscriber from HLR. The information from HLR to VMS is transmitted by using a MAP interface therebetween. The MAP interface is on the YKM protocol level 6 in GSM. It relates to a mobile application part for determining the use of HLR and other registers in a mobile network. (reference: standard ETSI/GSM 09.02:MAP; FIG. 5.6.1 (a) Subscriber parameter request).

If a subscriber only uses the telephone within the allocated area, the operation is perfectly normal without any arrangements. In case a subscriber moves e.g. to another city, into the area of another MSC, HLR registers this move.

The VMS, in which a subscriber belongs (the old VMS), monitors the information about movements of the subscriber and upon concluding that the subscriber has moved more or less permanently into the area of some other MSC, it initiates a transfer of the subscriber to the new VMS. The Unnecessary transfer of subscribers from one station to another is something to be avoided and, thus, short visits to another area do not result in a transfer. The decision about a subscriber staying permanently within a new area is made if he or she has spent 20 of the last 30 days within the new area.

Figure 2:
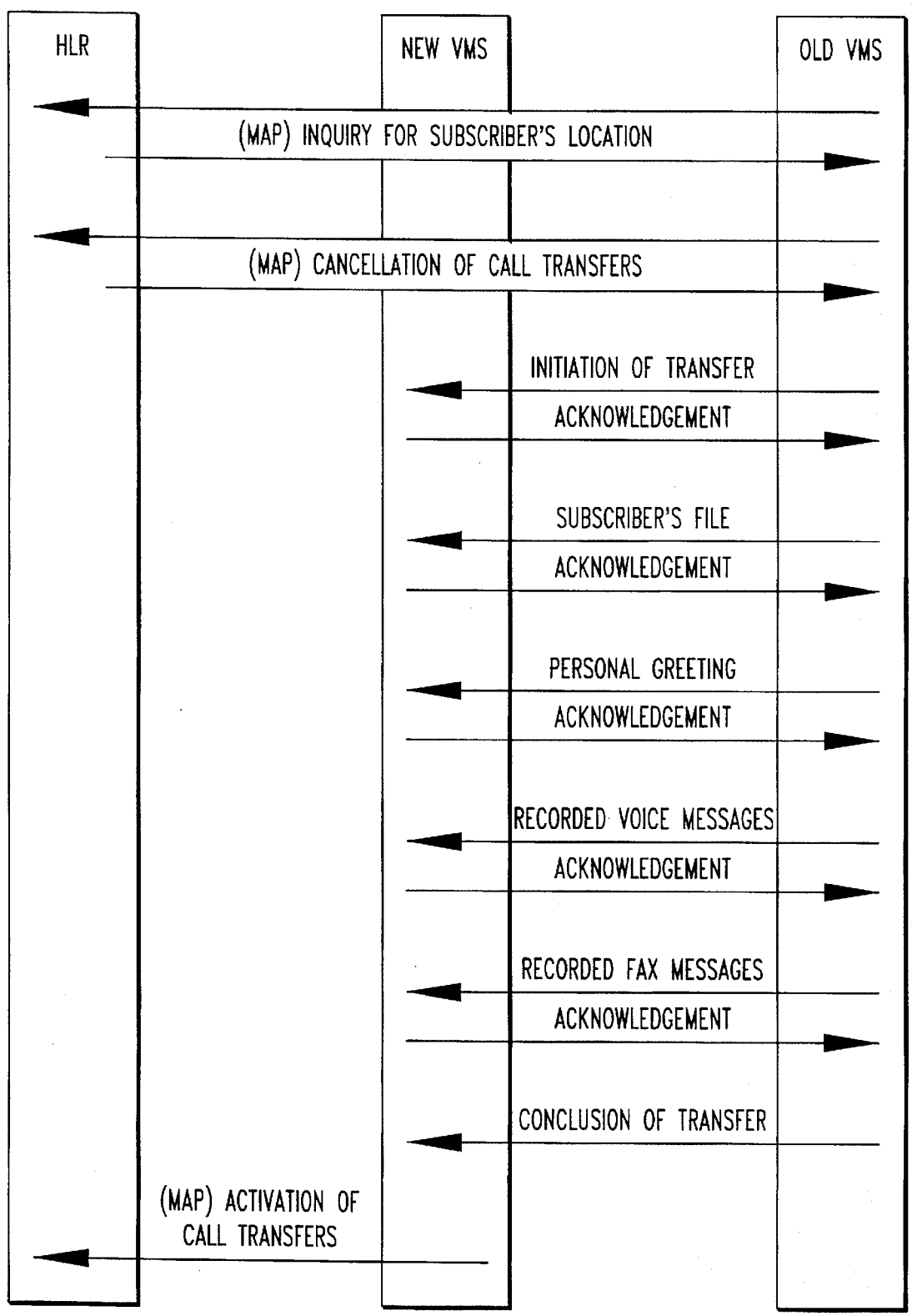
FIG. 2 shows a message chart.

The transfer of a subscriber proceeds such that the old VMS proposes a transfer to a new VMS, after whose acknowledgement the old VMS transmits the information on this particular subscriber (subscriber's file, personal greeting, recorded voice messages and e.g. possible fax messages). After each information package, the data transfer is acknowledged (FIG. 2: Message chart).

During the transfer, no messages can be left for a subscriber and, therefore, prior to a transfer, the old VMS submits to HLR a request to block the conveyance of messages and, after the transfer is completed, the new VMS reactivates it. The new VMS redetermines into the HLR "a forwarded-to-number" or an ISDN number to which this particular subscriber wishes to forward the incoming calls. (reference: standard ETSI/GSM 03.08 item 2.6.3.1 Forwarded-to-number).

The transfer time is in the order of 3 . . . 30 s/transfer depending on the amount of information to be transferred. The transfers are generally effected during the time outside busy hours. Since the network is generally dimensioned according to busy-hour traffic, the transfer do not require increased capacity of a network.

The system functions automatically, i.e. the operator need not be involved in its operation but that can be configurated if the operator wishes to modify its operation in a desired fashion. For example, a decision about the transfer of a subscriber can be re-scheduled to be made when the subscriber has spent 15 of the last 20 days within a new area.

Figure 3:
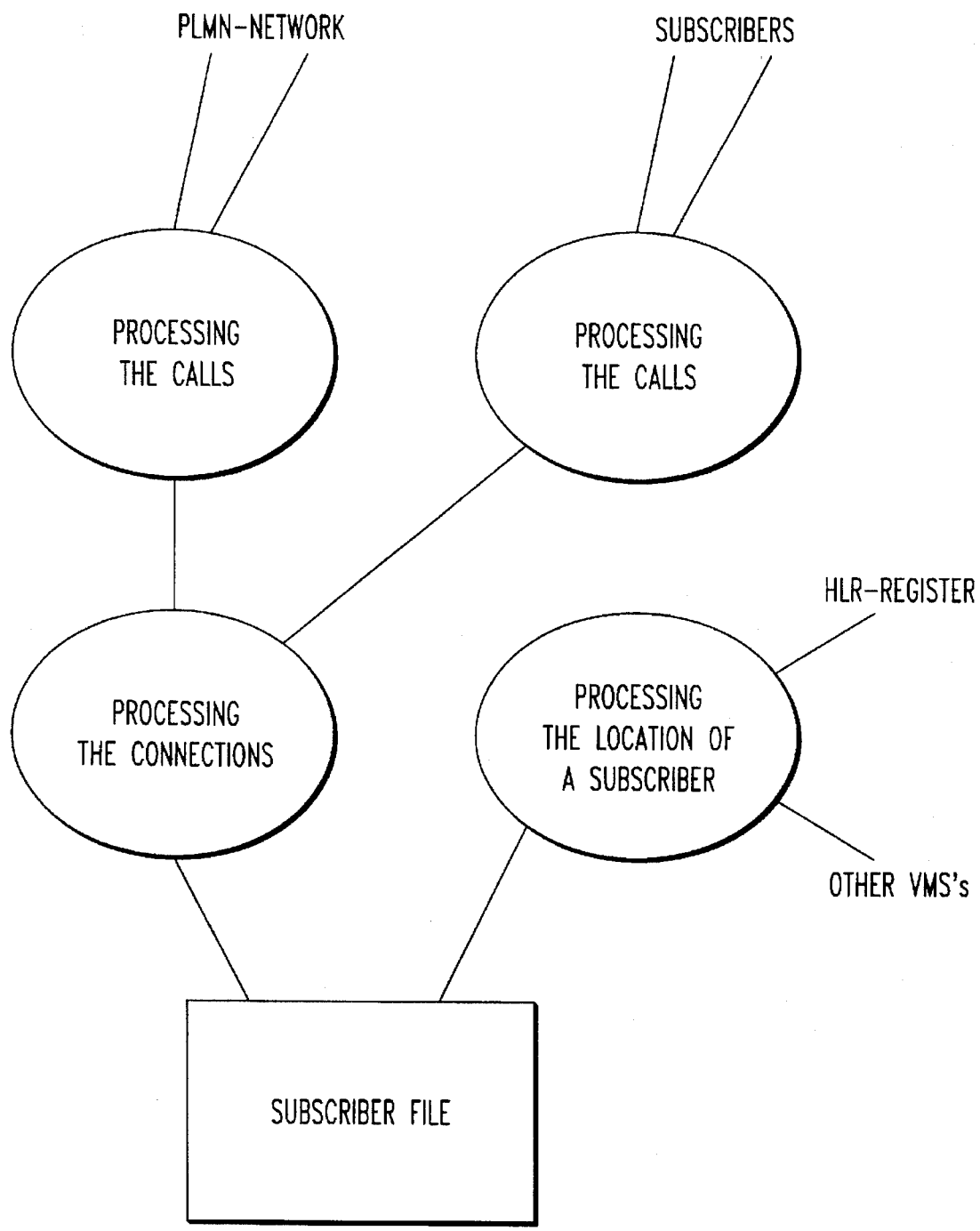
FIG. 3 illustrates the relative operation and outward communication for various sections of a VMS.

FIG. 3 depicts the relative operation and outward communication between various sections of a VMS. A process for the relocation of a subscriber is effected in the block "Processing the location of a subscriber" and the subscriber-related information is recorded in the "subscriber file".

Pertinent material:
ETSI/GSM 03.08 HLR int data, "Forwarded-to-number"
ETSI/GSM 09.02 MAP
ETSI/GSM 02.04 Supplementary Services
Descriptions:
ADMIN=Administrational Computer
ETSI=European Telecommunications Standards Institute
GSM=Global system for Mobile Communications
HLR=Home Location Register
mErl=milli Erlang (telephone traffic measuring unit)
MAP=Mobile Application Part
MSC=Mobile Switching Centre
MS-ISDN=Mobile Subscriber ISDN number
PCM=Pulse Code Modulation
PCM trunk line=Telephone line using PC modulation
PLMN=Public Land Mobile Network
VMS=Voice Messaging System
YKM=Joint Channel Signaling

What is claimed is:

1. A method for relocating a subscriber in a plurality of voice messaging systems connected with an extensive digital mobile network (GMS), including a plurality of mobile switching centres (MSC) each having a VMS associated therewith and a home location register (HLR), characterized in that, in the method, each VMS checks HLR repeatedly for the location of a subscriber and concludes on the basis of this information whether the subscriber has moved into the area of some other MSC for a period of time longer than a predetermined period of time and, if so, the old VMS transfers the subscriber-related information to the new VMS, thus accomplishing the automatic relocation of the subscriber's home station in connection with a new MSC.

2. A method as set forth in claim 1, characterized in that said check for the location of a subscriber is effected periodically, at fixed intervals.

3. A method as set forth in claim 1, characterized in that forwarding of calls to a subscriber's voice mail box is intercepted for the transfer of the subscriber-related information.

4. A method as set forth in claim 1, characterized in that said predetermined period of time is determined as a portion of the time spent within a new area relative to a certain time period.

5. A method as set forth in claim 2, characterized in that said predetermined period of time is determined as a portion of the time spent within a new area relative to a certain time period.

* * * * *